G. H. SANDS.
INTERNAL COMBUSTION STEAM GENERATOR.
APPLICATION FILED AUG. 11, 1914.
1,154,131.
Patented Sept. 21, 1915.
4 SHEETS—SHEET 3.
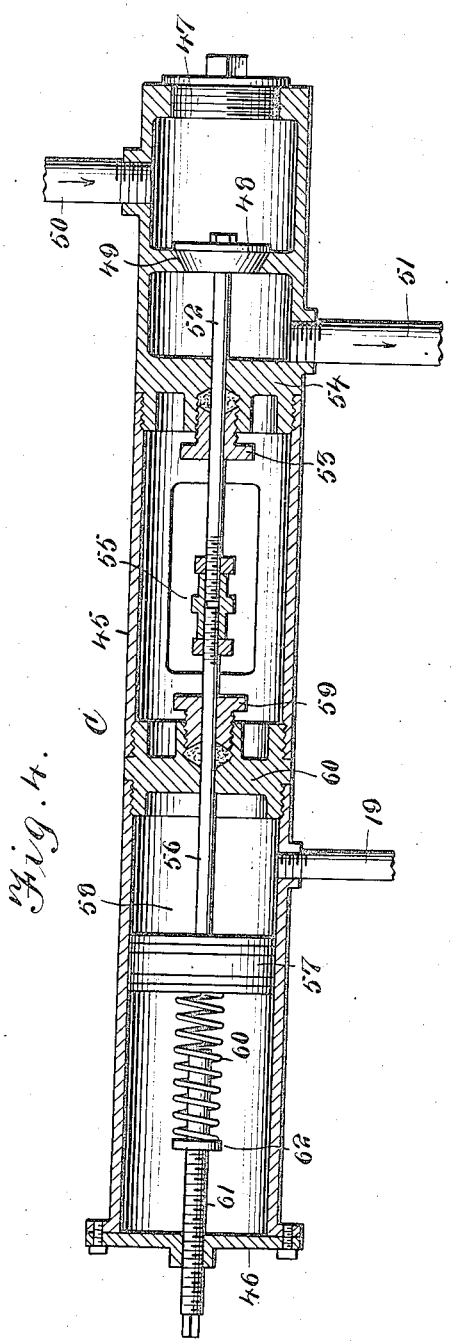
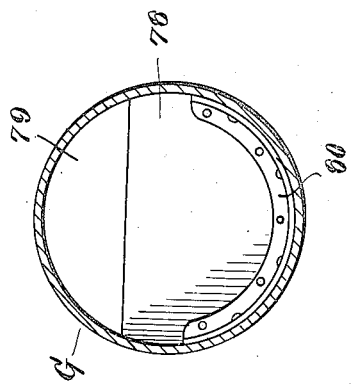
Witnesses
E. Q. Ruppert
P. M. Smith
Inventor
G. H. Sands
By Victor J. Evans
Attorney

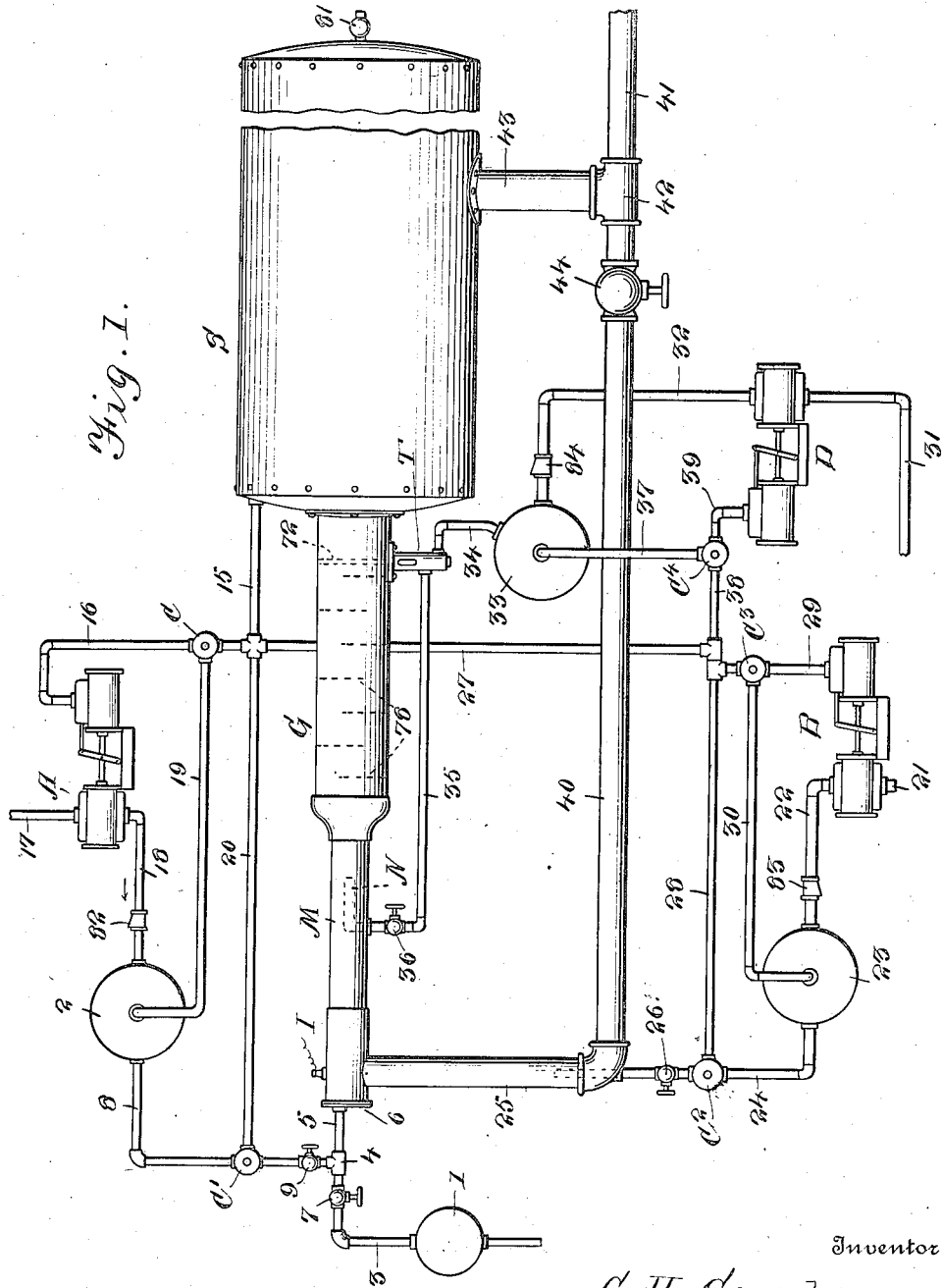

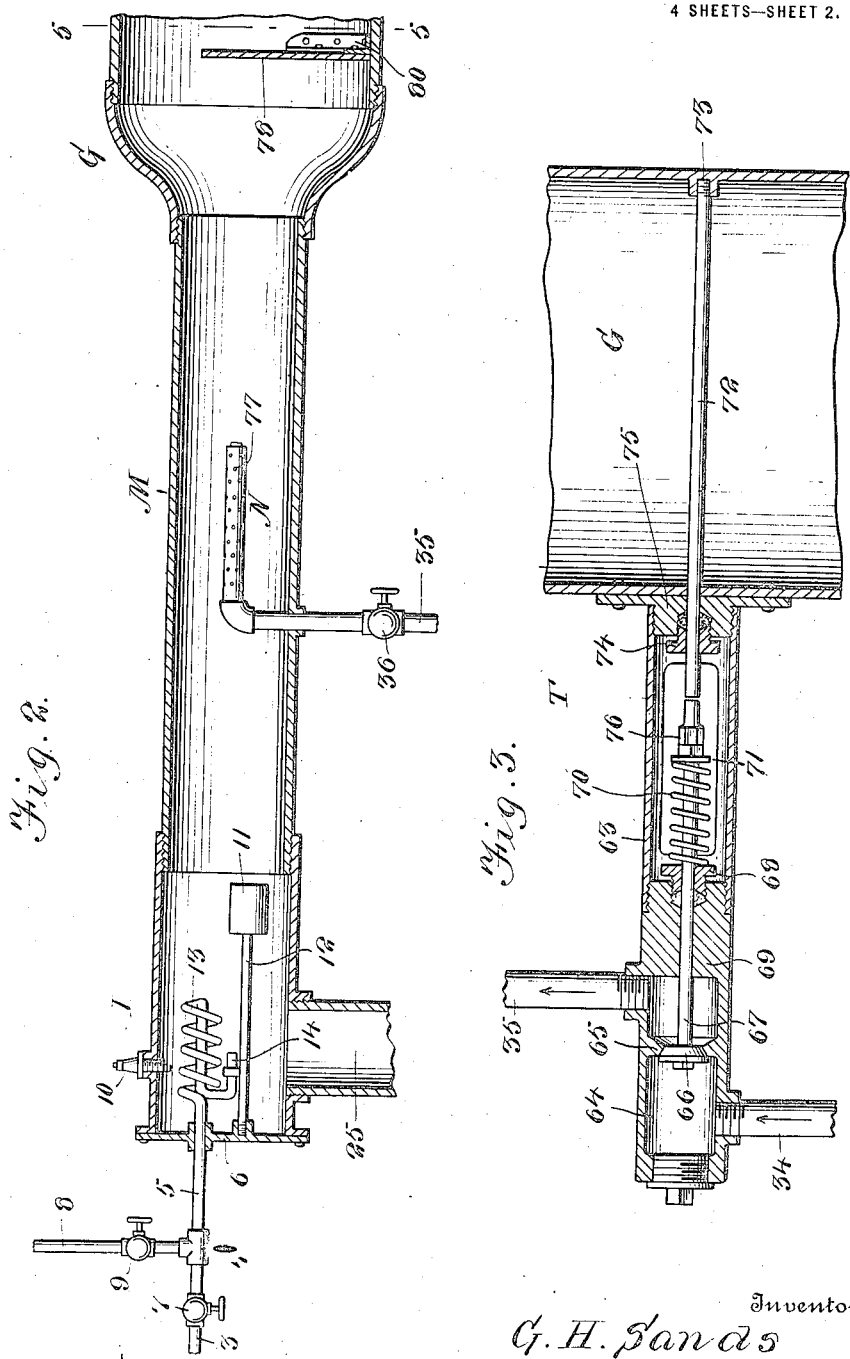

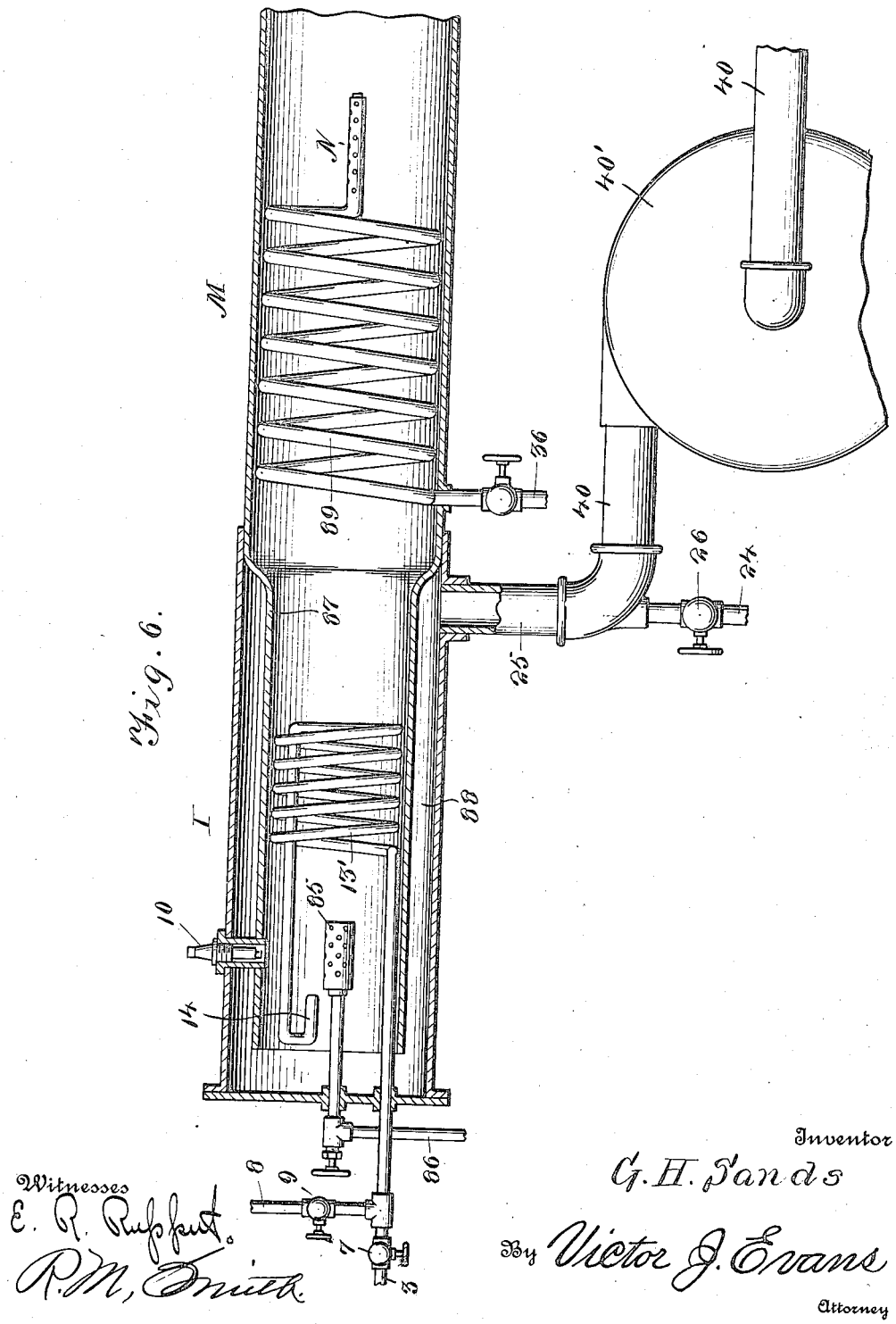

UNITED STATES PATENT OFFICE.

GEORGE H. SANDS, OF ELECTRA, TEXAS.

INTERNAL-COMBUSTION STEAM-GENERATOR.

1,154,131.  Specification of Letters Patent.  Patented Sept. 21, 1915.

Application filed August 11, 1914. Serial No. 856,217.

*To all whom it may concern:*

Be it known that I, GEORGE H. SANDS, a citizen of the United States, residing at Electra, in the county of Wichita and State of Texas, have invented new and useful Improvements in Internal-Combustion Steam-Generators, of which the following is a specification.

This invention relates to the generation of steam, the object of the invention being to greatly economize in the heat necessary to produce a given quantity of steam, the system hereinafter described doing away entirely with the old style boiler and practically every particle of heat contained in the fuel being utilized in the generation of steam to which is added the expansive quality of the gas produced from the fuel employed.

A further object of the invention is to produce an internal combustion steam generator in connection with which all kinds of liquid fuel and gas may be used such as natural gas, coal gas, gasolene and cruder oils such as kerosene, and alcohol.

A further object of the invention is to produce means whereby the supply of oxygen (contained in the air or steam), water and fuel to the combustion and mixing chambers may be regulated automatically in accordance with the steam pressure.

With the above and other objects in view, the invention consists in the novel construction, combination and arrangement of parts, as herein described, illustrated and claimed.

In the accompanying drawings:—Figure 1 is a general diagrammatic view of the steam generator, showing the entire system employed for generating and storing the steam. Fig. 2 is an enlarged longitudinal section through the main body of the generator. Fig. 3 is a similar view of the automatic water regulating, thermostatically controlled valve shown in its relation to the generating chamber which is also shown in section. Fig. 4 is a similar section of one of the several pump controlling valves. Fig. 5 is a cross section on the line 5—5 of Fig. 2. Fig. 6 is an enlarged longitudinal section through the combustion and mixing chambers showing the preferred construction of said portions of the apparatus.

Referring to the drawings I designates the ignition or combustion chamber, M the mixing chamber, G the generating chamber and S the storage tank for the steam, all of said parts being arranged end to end as shown in Figs. 1 and 2.

In connection with the combustion chamber I, two fuel tanks are employed, 1 designating a small gasolene tank and 2 the main fuel storage tank adapted to hold fuel under pressure. From the gasolene tank 1, a feed pipe 3 leads to a T 4 from which an extension feed pipe 5 leads through the head 6 of the combustion chamber I as illustrated in Fig. 2. The pipe 3 is controlled by a globe valve 7. From the fuel tank 2 a feed pipe 8 leads also to the T 4 and is provided with a globe valve 9, the valves 7 and 9 being used to turn on and off the supply of fuel and direct the proper fuel into the combustion chamber I. It may be stated at this point that the gasolene or other highly volatile fuel is first conducted from the tank 1 into the combustion chamber where it is ignited by a plug 10 which emits a practically continuous spark and such volatile fuel is used until the generator is thoroughly heated together with a hot igniter knob 11 in said combustion chamber, the said knob being supported by a stem or rod 12 shown as connected to the head 6 of the combustion chamber.

After the pipe 5 enters the combustion chamber it is formed into a heating coil 13 which terminates in an open end or nozzle 14 which faces toward the mixing chamber M. After the generator becomes thoroughly heated, the valve 7 is closed and the valve 9 opened thus admitting the cruder oil from the fuel tank 2 and the electrical current feeding the plug 10 may also be cut out as the igniter 11 will remain hot and cause the ignition of the gas as it is discharged from the heating coil 13.

In order to maintain the fuel in the tank 2 under pressure, I employ a fuel pump designated generally at A. This pump may be of any usual or preferred construction and is operated by steam which is furnished from the storage tank S through a steam pressure pipe 15 having a branch 16 which leads to the pump A as shown in Fig. 1.

17 designates a fuel supply pipe leading to the pump A and 18 a fuel pipe leading from the pump A to the tank 2.

Located in the branch pipe 16 is a fuel pump controlling valve C the detail construction of which is illustrated in Fig. 4 and will be hereinafter particularly described. A pressure pipe 19 leads from the fuel tank 2 to the controlling valve C and when the pressure in the tank 2 falls below a predetermined point the valve C is opened to allow the steam to pass to the pump A thereby setting said pump in operation and forcing more fuel into the tank 2 which results in again raising the pressure in said tank to a point which will cut out the further operation of the fuel pump A.

A fuel regulating or control valve C' is arranged in the fuel feed pipe 8 as shown in Fig. 1 and has connected thereto a branch 20 of the steam pressure pipe 15. This valve C' is therefore controlled by the steam pressure from the storage tank S, said valve admitting more fuel to the combustion chamber as the pressure decreases in the tank S.

B represents an air pump to which leads an air supply pipe 21 and from which a pipe 22 delivers the air under pressure to an air storage tank 23. From the tank 23 a pipe 24 extends into a relatively large air feed pipe 25 which in turn leads directly into the combustion chamber I as shown in Figs. 1 and 2.

26 designates a globe valve in the pipe 24 and C² designates another controlling valve for the air, said valve C² corresponding in construction and operation with the valves C and C' above referred to and to be hereinafter particularly described. From the steam pressure pipe 15 a branch 27 leads toward the pump B where it is provided with another branch 28 which leads to the valve C². Another branch 29 leads to the pump B and in the pipe 29 is an air pump controlling valve C³ corresponding in construction and operation with the valve C above described and from which a pressure pipe 30 leads to the tank 23. Now when the pressure in the air tank 23 falls below a predetermined point, the valve C³ opens and allows steam to pass to and actuate the pump B which thereupon restores the required air pressure in the tank 23.

D represents a water pump to which water is led through a supply pipe 31 and from which the water is directed through a pipe 32 into a water pressure tank 33. From the tank 33 a pipe 34 leads to a water inlet controlling valve T to be hereinafter particularly described and from said valve T a water feed pipe 35 leads to a spray nozzle N in the mixing chamber M as shown in Fig. 2. The pipe 35 is provided with a globe valve 36. From the water tank 33 a pressure pipe 37 leads to a water pump controlling valve C⁴ corresponding in construction and operation with the valve C above referred to, a branch steam pressure pipe 38 from the pipe 27 communicating with said valve C⁴ and a pipe 39 leading from said valve to the pump D. It will now be seen that when the pressure falls in the tank 33, the valve C⁴ is opened to admit steam to the pump D which is therefore operated and caused to pump water into the tank 33 until the pressure therein is raised to a point which will cut out the pump D.

The air pipe 25 is provided with a branch or extension 40 which communicates with the steam delivery pipe 41, the latter being shown as connected by a T 42 to a pipe 43 which takes the steam off from the storage tank for service. Adjacent to the T 42, the pipe 40 is provided with a globe valve 44 which may be opened to allow a certain proportion of the steam from the tank S to pass through the pipes 40, circulator 40', and 25 into the combustion chamber I to mix with the fuel and assist combustion.

Referring now to Fig. 4 for an illustration of the controlling valve C which as above indicated is the exact counterpart of each of the other valves C', C², C³ and C⁴ referred to in the foregoing description, it will be seen that said valve comprises, in the preferred embodiment thereof, a cylindrical valve casing 45 closed at one end by a head 46 and having at its opposite end a threaded and removable cap or plug 47 closing an opening of sufficient size to readily admit of the passage of the valve 48 therethrough. The valve 48 coöperates with a valve seat 49 between the inlet pipe 50 and the outlet pipe 51, the said pipes 50 and 51 allowing for the inflow and outflow of steam to operate one of the pumps hereinabove described. The valve 48 is provided with a stem 52 which passes through a stuffing box 53 in an internal wall 54 forming one end of the valve chamber, said stem 52 being coupled by means of a union or connecting nut 55 to the rod 56 of a piston 57 which is movable back and forth in a pressure chamber 58, the rod 56 passing through a stuffing box 59 in the head 60 at the inner end of the pressure chamber 58. Back of the piston 57 is a piston actuating spring 60 which operates to open the valve 48 when the pressure of the air or water or fuel in its respective tank falls below a certain point. The tension of the spring 60 is adjusted by means of a tension screw 61 adapted to be turned from the exterior of the valve casing as shown in Fig. 4, said stem being provided with a shoulder 62 which bears against one end of the spring 60, the opposite end of the latter bearing against the piston 57. 19 designates the pressure pipe which corresponds with the pipe 19 in Fig. 1 which extends from the fuel tank 2 to the controlling valve C, but the pipe 19 in Fig. 4 also represents the pressure pipes 30 and 37 which are associated, respectively, with the air tank 23 and the water tank 33.

It will now be understood from the description of the controlling valve C that when the pressure of the air or water or fuel in its tank falls below a predetermined point, the pressure in the chamber 58 will be correspondingly lowered and this will permit the spring 60 to open the valve 48 and permit steam to flow in the direction of the arrows in Fig. 4 thereby setting the respective pump in operation which in turn acts to restore the pressure in that particular tank. It will be observed that this construction and operation obtains in connection with each of the tanks and pumps for the water, air and fuel.

The automatic valve for controlling the feed of water to the spray nozzle N is illustrated in Fig. 3 wherein it will be seen that said valve comprises in its preferred embodiment a substantially cylindrical valve casing 63 containing a valve chamber 64 with an internal valve seat 65 with which a water inlet valve 66 coöperates. The feed pipe 34 leads into one end of the valve chamber 64 and the outgoing feed pipe 35 leads into the opposite end thereof so that when the valve 66 is closed, the water is cut off from the nozzle N. The valve 66 is provided with a stem 67 which passes through a stuffing box 68 in the head 69 of the valve chamber and said valve is pressed toward and against its seat by means of a coiled expansion spring 70 which surrounds the stem 67 and bears against a shoulder 71 on said stem. Directly in line with the stem 67 is a thermostat consisting for convenience of a copper rod 72 which extends across the generating chamber G as shown in Figs. 1 and 3, said rod being fastened at one end as shown at 73 to a wall of the generating chamber and being slidable at its opposite end through an opening in the wall of the generating chamber where it passes through a stuffing box 74 formed on a bracket or base 75 to which the valve casing 63 is connected and by means of which it is supported as shown in Fig. 3. On the extremity of the valve stem 67 is an adjustable member 76 to provide for lengthening and shortening the valve stem 67 so that the throw or opening and closing movement of the valve 66 may be regulated. In operation, as the rod 72 becomes heated, it expands in the direction of its length and by contacting with the adjustable member 76 of the valve stem 67, the valve 66 is opened proportionately and water in the proper quantity passes through the valve chamber 64 from the tank 63 to the spray nozzle N. This nozzle is shown as in the form of a tube with a large number of small jet openings 77. It will thus be seen that water is supplied to the nozzle N in proportion to the demand for steam. In order to produce steam more rapidly, it is necessary to raise the heat in the combustion chamber I and this requires more air and more fuel. As heat increases, more water is of course required to generate the steam in accordance with the demand and such additional heat acting on the rod 72 causes it in turn to open the valve 66 to a greater extent thereby automatically increasing the supply of water in accordance with the increased heat in the combustion chamber.

In the generating chamber G there are arranged baffles 78 which as illustrated in Fig. 1 are connected alternately to opposite walls of said generating chamber. One of said baffles is better illustrated in Figs. 2 and 5 wherein it will be observed that each baffle is in the form of an incomplete disk, a portion of the disk being removed to leave a space 79 for the passage of the steam. The baffles may be fastened to the inside of the generating chamber in any convenient way, the means shown in Figs. 2 and 5 consisting of a flanged attaching strip 80 of metal which is riveted to the generating chamber and to the baffle. These baffles produce a violent agitation of the products of combustion and water and they are directed rapidly through the generating chamber into the final steam storage tank S. The steam is thus generated as rapidly as it is used and practically every particle of heat is utilized thus effecting a great saving as compared with the ordinary old style steam boiler now in common use.

The steam tank S will be provided with a safety or pop valve 81 and may also be equipped with a pressure gage, heat gage, etc., as may be found desirable. The pipe 18 is provided with a back pressure check valve 82, the pipe 22 is provided with a similar check valve 83, and the pipe 32 is also provided with a similar valve 84.

From the foregoing description it will now be understood that the generator as a whole is entirely automatic in its operation after the initial heating of the combustion chamber, and the fuel heating coil and igniter contained in the said combustion chamber. As there is a demand for more steam, more fuel and more air are automatically admitted to the combustion chamber and simultaneously therewith more water is admitted to the spray nozzle in the mixing chamber and conversely as there is a less demand for steam, the feed of the air, fuel and water is decreased. In this way the heat is conserved and practically all of the fuel is used without loss in the generation of steam.

After the steam has been thoroughly generated and the whole system thoroughly heated, the air pump may be shut off or stopped, the valve 26 being closed, the oxygen necessary to support combustion being furnished by the steam passing through the pipe 40 which has incorporated therein the circulator 40', as shown in Fig. 6.

In lieu of the hot bulb 11 shown in Fig. 2, a pilot burner 85 may be employed as shown in Fig. 6, fuel to said burner being supplied by a feed pipe 86 leading from the tank 2 hereinabove referred to. The coil 13' corresponding with the coil 13 of Fig. 2 is surrounded by an internal tubular casing 87 which forms a steam superheating chamber 88 between the outer wall of the combustion chamber I and said inner tubular casing 87 which incloses the coil 13. The casing 87 is left open at the forward end thereof to admit the superheated steam after it has moved lengthwise of the superheating chamber 88. This also materially aids combustion, and the generation of steam with a minimum degree of heat. I also prefer to equip the water pipe 36 with a water heating coil 89 located within the mixing chamber M and terminating in the nozzle N above described. This serves to bring the water practically to a boiling point before it is sprayed into the mixing chamber.

What I claim is:—

1. In a steam generator, a gas combustion chamber having fuel and air inlets, a mixing chamber into which the ignited gas is discharged from said combustion chamber, a water injector nozzle arrranged to spray water directly into the ignited gas in the mixing chamber, a generating chamber into which the resultant mixture is discharged, and a series of reversely arranged deflecting baffles in said generating chamber.

2. In a steam generator, a gas combustion chamber having fuel and air inlets, a mixing chamber into which the ignited gas is discharged from said combustion chamber, a water injector nozzle arranged to spray water directly into the ignited gas in the mixing chamber, tanks for containing air, water and fuel under pressure in communication with said combustion and mixing chambers, independent air, water and fuel pumps, and independent controlling valve mechanism for each pump controlled by the pressure in the respective tanks for regulating the feed of air, water and fuel to said combustion and mixing chambers.

3. The combination with a steam generator, of a plurality of tanks in communication therewith one adapted to contain air, another water and another fuel under pressure, independent pumps for forcing said elements into said tanks under pressure, steam pipes leading from the generator to each of said pumps for independently operating the latter, and a controlling valve for each pump controlled by the pressure in the tank with which the respective pump is associated.

4. In a steam generator, a gas combustion chamber having fuel and air inlets, a mixing chamber into which the ignited gas is discharged from said combustion chamber, a fuel heating coil in said combustion chamber, a superheating chamber surrounding said coil, and a water injector nozzle arranged to spray water directly into the ignited gas in the mixing chamber.

5. In a steam generator, a gas combustion chamber having fuel and air inlets, a fuel heating coil in said chamber, a mixing chamber into which the ignited gas is discharged from said combustion chamber, a superheating chamber surrounding said fuel heating coil, a steam pipe leading to said superheating chamber, a circulator in said steam pipe, and a water injector nozzle arranged to spray water directly into the ignited gas in the mixing chamber.

In testimony whereof I affix my signature in presence of two witnesses.

GEO. H. SANDS.

Witnesses:
C. B. LANE,
P. S. WOLFE.